(12) United States Patent
Shiokawa

(10) Patent No.: US 11,802,848 B2
(45) Date of Patent: Oct. 31, 2023

(54) PH MEASURING DEVICE AND PH MEASURING METHOD

(71) Applicant: Tokyo Electron Limited, Tokyo (JP)

(72) Inventor: Toshiyuki Shiokawa, Koshi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 220 days.

(21) Appl. No.: 17/295,126

(22) PCT Filed: Nov. 11, 2019

(86) PCT No.: PCT/JP2019/044110
§ 371 (c)(1),
(2) Date: May 19, 2021

(87) PCT Pub. No.: WO2020/105487
PCT Pub. Date: May 28, 2020

(65) Prior Publication Data
US 2022/0018802 A1    Jan. 20, 2022

(30) Foreign Application Priority Data

Nov. 22, 2018   (JP) ................................ 2018-219386

(51) Int. Cl.
*G01N 27/416*  (2006.01)
*G01N 27/38*   (2006.01)

(52) U.S. Cl.
CPC ........... *G01N 27/38* (2013.01); *G01N 27/416* (2013.01); *G01N 27/4167* (2013.01)

(58) Field of Classification Search
CPC .. G01N 27/38; G01N 27/416; G01N 27/4165; G01N 27/4167; G01N 27/302; G01N 27/403; G01N 27/333
See application file for complete search history.

(56) References Cited

U.S. PATENT DOCUMENTS 3,997,420 A * 12/1976 Buzza ................ G01N 33/4925
204/411
4,151,255 A *  4/1979 Capuano ............ G01N 27/4165
422/62
4,447,775 A *  5/1984 Breuker ................ G01N 27/28
204/402

(Continued)

FOREIGN PATENT DOCUMENTS

JP        3064723 A    7/2000
JP    2002-005873 A    1/2002
(Continued)

OTHER PUBLICATIONS

International Search Report for PCT/JP2019/044110 dated Feb. 10, 2020.

*Primary Examiner* — Alexander S Noguerola
(74) *Attorney, Agent, or Firm* — Pearne & Gordon LLP

(57) ABSTRACT

A pH measuring device configured to measure a pH of a target liquid includes a main body block including a cavity, a supply line communicating with the cavity, a first drain line communicating with the cavity, and a target liquid supply valve configured to adjust a supply of the target liquid into the supply line. The main body block has an integral structure in which a pH sensor is supported such that the pH sensor is in contact with the target liquid within the cavity.

7 Claims, 4 Drawing Sheets

(56) References Cited

U.S. PATENT DOCUMENTS 5,074,157 A * 12/1991 Marsoner ........ G01N 33/48707
73/864.81

FOREIGN PATENT DOCUMENTS

| JP | 2005-517399 A | 6/2005 |
| JP | 2016-055245 A | 4/2016 |
| WO | 03/068906 A1 | 8/2003 |

* cited by examiner

PH MEASURING DEVICE AND PH MEASURING METHOD

CROSS-REFERENCE TO RELATED APPLICATION

This Application is a U.S. national phase application under 35 U.S.C. § 371 of PCT Application No. PCT/JP2019/044110 filed on Nov. 11, 2019, which claims the benefit of Japanese Patent Application No. 2018-219386 filed on Nov. 22, 2018, the entire disclosures of which are incorporated herein by reference.

TECHNICAL FIELD

The various aspects and embodiments described herein pertain generally to a pH measuring device and a pH measuring method.

BACKGROUND

As a pH sensor for detecting a pH of a target liquid, there is known a sensor configured to detect the pH of the target liquid by measuring a potential difference caused by a pH difference between a standard liquid and the target liquid (see, for example, Patent Document 1). Due to a structural characteristic of this pH sensor, however, there is a likelihood that the standard liquid (for example, potassium chloride) or an electrode component (for example, metal) may leak from this pH sensor, and this leaked component may contaminate the target liquid. For example, when the target liquid is a chemical liquid for a semiconductor processing, the component leaked from the pH sensor may have an adverse effect on the semiconductor processing. Thus, it is not desirable to use the target liquid contaminated by the pH measurement in the semiconductor processing.

To suppress the use of the contaminated target liquid in the semiconductor processing or the like, there may be employed a method involving processes of extracting a part of the target liquid as a sample liquid, detecting a pH of this corresponding sample liquid by the pH sensor, and then draining the corresponding sample liquid. In this case, to suppress consumption of the target liquid, it is desirable to reduce the amount of the sample liquid used in the pH measurement. Further, in case of measuring a pH of an intermediate solution when multiple kinds of chemical liquids are mixed, a content and a content ratio of the chemical liquids in a finally produced mixed solution may fluctuate largely if a sampling amount of the intermediate liquid increases. Thus, for the purpose of suppressing the fluctuation of the content and the content ratio of the chemical liquids in the mixed solution, it is desirable that the amount of the sample liquid used in the pH measurement is small.

Patent Document 1: Japanese Patent No. 3064723

SUMMARY

In an exemplary embodiment, a pH measuring device configured to measure a pH of a target liquid includes a main body block including a cavity, a supply line communicating with the cavity, a first drain line communicating with the cavity, and a target liquid supply valve configured to adjust a supply of the target liquid into the supply line. The main body block has an integral structure in which a pH sensor is supported such that the pH sensor is in contact with the target liquid within the cavity.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, a pH measuring device configured to measure a pH of a target liquid and a pH measuring method thereof will be described with reference to the accompanying drawings.

[pH Measuring Device]

Figure 1:
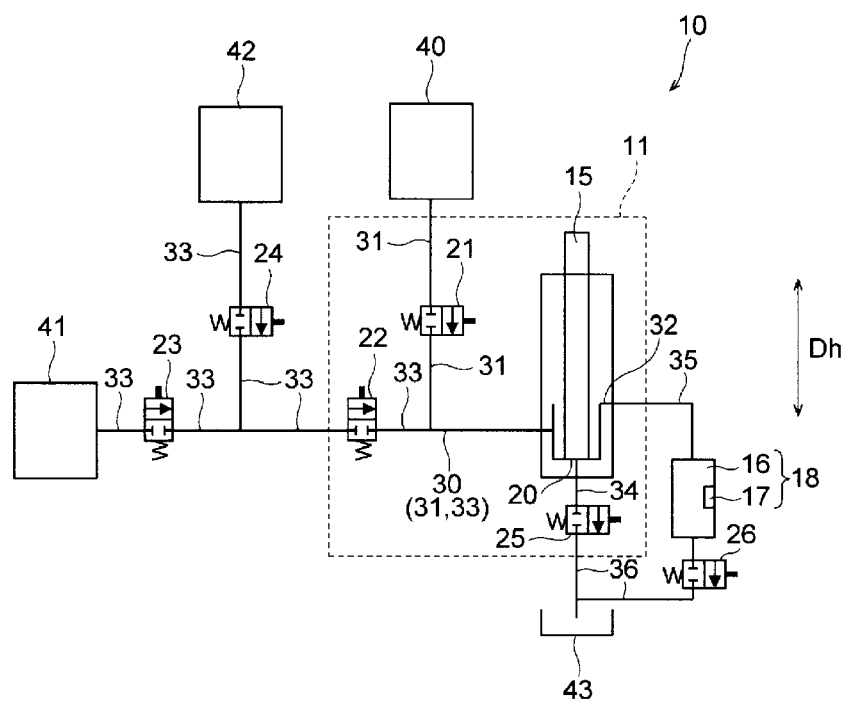
FIG. 1 is a diagram illustrating an example of a flow path configuration of a pH measuring device.

FIG. 1 is a diagram illustrating an example of a flow path configuration of a pH measuring device 10.

The pH measuring device 10 shown in FIG. 1 is equipped with a main body block 11 having an integral structure. The main body block 11 having the integral structure basically has a structure which cannot be disassembled into multiple parts. Desirably, the entire main body block 11 has the same composition and does not have a seam.

The main body block 11 includes a cavity 20, a supply line 31 and a first drain line 32. Each of the supply line 31 and the first drain line 32 communicates with the cavity 20.

The cavity 20 is a space in which the target liquid is stored for pH measurement. A pH sensor 15 supported by the main body block 11 is configured to be in contact with the target liquid stored in the cavity 20. This cavity 20 is a space partitioned by the pH sensor 15 and the main body block 11. Although a specific shape of the cavity 20 is not particularly limited, the cavity 20 is extended in a height direction Dh (that is, a direction parallel to a direction of gravity) at least partially.

The supply line 31 is connected to the cavity 20 and, also, to a target liquid tank 40 to supply the target liquid into the cavity 20 from the target liquid tank 40. The supply line 31 is provided with a target liquid supply valve 21. The target liquid supply valve 21 is configured to adjust a supply of the target liquid into the supply line 31. The target liquid supply valve 21 in the shown example is capable of adjusting an introduction amount of the target liquid into the supply line 31 from the target liquid tank 40. The target liquid having an amount adjusted by the target liquid supply valve 21 is supplied into the cavity 20 through the supply line 31. As stated, the target liquid supply valve 21 has a function of extracting a part of the target liquid stored in the target liquid tank 40 as a sample liquid, and serves to adjust the amount of the target liquid used for the pH measurement.

To reduce the amount of the target liquid used in the pH measurement, it is desirable that an orifice diameter of the target liquid supply valve 21 and a flow path diameter (that is, a cross sectional diameter) of the supply line 31 are small. If, however, the orifice diameter of the target liquid supply valve 21 and the flow path diameter of the supply line 31 decrease, a flow resistance applied to the target liquid increases, resulting in an increase of a pressure loss. For the reason, it is desirable to set the orifice diameter of the target liquid supply valve 21 and the flow path diameter of the supply line 31 in consideration of a characteristic of the target liquid such as viscosity thereof as well as the amount of the target liquid used in the pH measurement.

The first drain line 32 is a line through which the target liquid and other liquids are drained to the outside from the cavity 20. The target liquid or the like overflown from the cavity 20 is introduced into the first drain line 32 in the shown example. That is, when the liquid within the cavity 20 flows over a connection point where the first drain line 32 is connected to the cavity 20, the liquid is introduced into the first drain line 32 from the cavity 20. The first drain line 32 is connected with a communication line 35 via a joint (not shown). The liquid introduced into the first drain line 32 by being overflown from the cavity 20 is sent to a liquid storage 16 through the communication line 35.

The target liquid supplied to the cavity 20 via the supply line 31 as stated above is stored within the cavity 20 until it reaches a height position where the first drain line 32 is connected to the cavity 20. The supply line 31 and the first drain line 32 are connected to the cavity 20 at height positions which allow the target liquid suitable for the pH measurement of the pH sensor 15 to be stored in the cavity 20. In the example shown in FIG. 1, in the height direction Dh, the position where the first drain line 32 is connected to the cavity 20 is higher than the position where the supply line 31 is connected to the cavity 20.

The liquid storage 16 communicating with the cavity 20 through the communication line 35 and the first drain line 32 along with a liquid amount detector 17 configured to detect the amount of the liquid stored in the liquid storage 16 constitute an overflow detecting unit 18.

Specific configurations of the liquid storage 16 and the liquid amount detector 17 are not particularly limited. By way of non-limiting example, a small-size tank may be used as the liquid storage 16. Further, a general level sensor may be used as the liquid amount detector 17. The liquid amount detector 17 may be implemented by a sensor configured to detect presence or absence of a preset amount of the liquid within the liquid storage 16, or a sensor configured to measure a specific amount of the liquid stored in the liquid storage 16 (for example, a liquid surface height). As stated above, the overflow detecting unit 18 detects the liquid introduced into the liquid storage 16 by being overflown from the cavity 20.

By way of example, if the target liquid within the cavity 20 does not reach the connection point where the first drain line 32 is connected to the cavity 20, the target liquid is not introduced into the liquid storage 16, so the liquid amount detector 17 does not detect the liquid within the liquid storage 16. Meanwhile, if the target liquid within the cavity 20 reaches the connection point between the first drain line 32 and the cavity 20 to be introduced into the first drain line 32, the target liquid is stored in the liquid storage 16, so that the liquid amount detector 17 detects the liquid within the liquid storage 16.

Thus, the connection point (particularly, the position in the height direction Dh) where the first drain line 32 is connected to the cavity 20 is set such that the target liquid having an enough amount for the pH measurement is stored in the cavity 20 when the target liquid within the cavity 20 reaches the connection point between the first drain line 32 to the cavity 20. By setting the connection point where the first drain line 32 is connected to the cavity 20 as stated above, it is possible to determine, based on the detection result of the liquid amount detector 17, whether the target liquid in an enough amount for the pH sensor 15 to appropriately detect the pH of the target liquid is stored in the cavity 20.

As will be described later, the detection result of the liquid amount detector 17 is sent to a controller (see a reference numeral 50 in FIG. 3), and various kinds of valves including the target liquid supply valve 21 are controlled by the controller.

For example, in a period during which the storage of the target liquid within the liquid storage 16 is not detected by the liquid amount detector 17, the controller may maintain the target liquid supply valve 21 in an open state. Accordingly, the supply line 31 is not closed by the target liquid supply valve 21, and the target liquid can be introduced into the cavity 20 from the target liquid tank 40 via the supply line 31. Meanwhile, if the liquid amount detector 17 detects the storage of the target liquid within the liquid storage 16, the controller may turn the target liquid supply valve 21 into a closed state. Accordingly, the supply line 31 is closed by the target liquid supply valve 21, and the introduction of the target liquid into the cavity 20 from the target liquid tank 40 is stopped.

As stated above, by switching the open/closed states of the supply line 31 based on the detection result of the liquid amount detector 17, the sufficient amount of the target liquid can be supplied into the cavity 20 while suppressing a surplus of the target liquid in waste from being supplied to the cavity 20. Further, the controller may turn the target liquid supply valve 21 into the closed state at a timing when the liquid amount detector 17 detects the presence of the target liquid within the liquid storage 16, or at a timing when the preset amount of the target liquid is stored in the liquid storage 16.

The liquid storage 16 in the shown example is connected to a drain line 36 via a second drain valve 26. When the second drain valve 26 is put in a closed state, the liquid stored in the liquid storage 16 is not drained toward the drain line 36. Meanwhile, when the second drain valve 26 is put in an open state, the liquid storage 16 communicates with the drain line 36, so that the liquid stored in the liquid storage 16 is drained into a drain tank 43 via the drain line 36.

The pH sensor 15 is supported by the main body block 11 to be in contact with the target liquid within the cavity 20, and is configured to detect the pH of the target liquid stored in the cavity 20. A specific pH measurement mechanism of the pH sensor 15 is not particularly limited. Typically, the target liquid stored in the cavity 20 is guided into a pH detector (see a reference numeral 15a in FIG. 2), and the pH of the target liquid is detected by measuring a potential difference between a standard liquid and the target liquid introduced into the pH detector.

The cavity 20 is further connected with a cleaning line 33. The cleaning line 33 is a line through which a cleaning fluid is supplied to the cavity 20, and a part of this cleaning line 33 is formed in the main body block 11. The cleaning line 33 in the shown example is connected to the cavity 20 and, also, to a cleaning liquid tank 41 and a cleaning gas tank 42. A cleaning liquid and a cleaning gas can be flown to the cleaning line 33 as cleaning fluids.

The cleaning line 33 is equipped with a cleaning liquid supply valve 22, a cleaning liquid regulating valve 23 and a cleaning gas regulating valve 24. The cleaning liquid supply valve 22 is configured to adjust the supply of the cleaning liquid and the cleaning gas to the cleaning line 33 and the cavity 20. The cleaning liquid supply valve 22 in the shown example is provided at a connecting line 30 to be described later in the main body block 11, and adjusts the supply of the cleaning liquid and the cleaning gas into the connecting line 30. The cleaning liquid regulating valve 23 is provided at a part of the cleaning line 33 which is led from the cleaning liquid tank 41 to the cleaning liquid supply valve 22. The cleaning gas regulating valve 24 is provided at a part of the cleaning line 33 which is led from the cleaning gas tank 42 to the cleaning liquid supply valve 22.

The main body block 11 in the shown example has the connecting line 30 extended from the cavity 20. The connecting line 30 forms at least a part of the supply line 31 and also forms at least a part of the cleaning line 33. The entire portion of the connecting line 30 constituting the supply line 31 forms a part of the cleaning line 33. In this configuration where a part of the connecting line 30 is shared by the supply line 31 and the cleaning line 33, the supply line 31 (particularly, a portion thereof formed by the connecting line 30) as well as the cavity 20 can be cleaned by the cleaning liquid and the cleaning gas flowing in the cleaning line 33.

Further, since the supply line 31 is provided at a position closer to the cavity 20 than the cleaning line 33 is, the total length of the supply line 31 can be shortened effectively. By reducing the length of the supply line 31 led from the target liquid tank 40 to the cavity 20, the amount of the target liquid reserved within the supply line 31 in the pH measurement can be reduced, and, besides, the amount of the target liquid consumed by the pH measurement can also be reduced.

The main body block 11 in the shown example is further equipped with a second drain line 34 connected to the cavity 20 at a position under the first drain line 32. The second drain line 34 is a line through which the cleaning liquid and other liquids are drained to the outside from the cavity 20. Particularly, the second drain line 34 is a line through which the liquid within the cavity 20 itself without being overflown from the first drain line 32 can be drained. The main body block 11 further includes a first drain valve 25 connected to the second drain line 34. The second drain line 34 in the shown example is connected to the drain line 36 via the first drain valve 25, and the drain line 36 is connected to the drain tank 43.

The first drain valve 25 is configured to adjust a flow of the liquid from the cavity 20 into the second drain line 34. When the first drain valve 25 is put in an open state, the second drain line 34 is opened, and the liquid within the cavity 20 is drained into the drain tank 43 via the second drain line 34 and the drain line 36 due to gravity. Meanwhile, when the first drain valve 25 is put in a closed state, the second drain line 34 is closed, so that the liquid does not flow into the drain line 36 from the second drain line 34.

If the liquid within the cavity 20 can be sufficiently drained through the first drain line 32, the second drain line 34 and the first drain valve 25 may be omitted. For example, when cleaning the cavity 20 by the cleaning liquid, the cleaning liquid can be drained through both the first drain line 32 and the second drain line 34 to be drained efficiently. If this efficient draining of the liquid is not necessary, however, the second drain line 34 may not be provided, and the liquid within the cavity 20 may be drained through the first drain line 32 only. Further, depending on a characteristic of the target liquid such as viscosity thereof, the cleaning of the cavity 20 and the supply line 31 by the cleaning liquid may not be required. In such a case, the second drain line 34 may not be provided in the main body block 11, and the liquid (particularly, the target liquid) within the cavity 20 can be sufficiently drained through the first drain line 32 only. Furthermore, depending on the characteristics of the liquid (particularly, the target liquid) flown into the cavity 20, it may be determined whether or not to drain the liquid from the cavity 20 through the second drain line 34.

Figure 2:
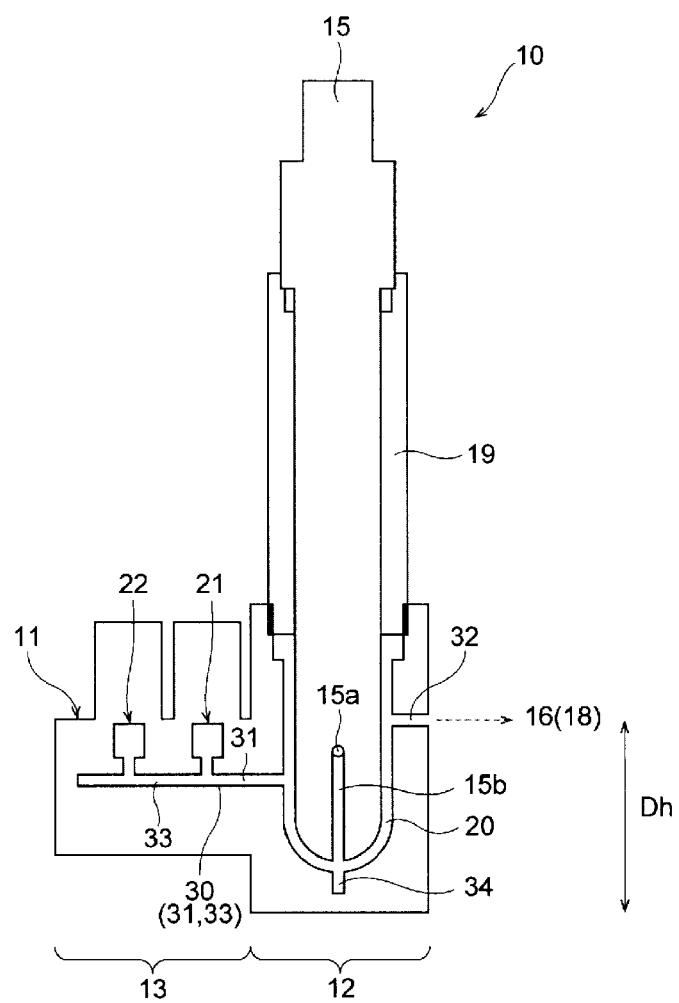
FIG. 2 is a cross sectional view illustrating an example of a specific structure of the pH measuring device.

FIG. 2 is a cross sectional view illustrating an example of a specific structure of the pH measuring device 10. A flow path of the pH measuring device 10 shown in FIG. 2 corresponds to the flow path structure shown in FIG. 1, and detailed description of the features already described above will be omitted. FIG. 2 mainly illustrates the main body block 11 and the pH sensor 15. In FIG. 2, illustration of the components such as overflow detecting unit 18, the target liquid tank 40, the cleaning liquid tank 41 and the cleaning gas tank 42 shown in FIG. 1 is omitted.

Further, though the first drain valve 25 is not shown in FIG. 2, the first drain valve 25 is provided horizontally (that is, a direction perpendicular to the height direction Dh) with respect to the second drain line 34. That is, since the first drain valve 25 is provided at a position hidden by the main body block 11 shown in FIG. 2, it is not illustrated in FIG. 2. Actually, however, the first drain valve 25 is provided in the main body block 11.

The main body block 11 having the integral structure has a measurement unit 12 and an introduction unit 13. The measurement unit 12 and the introduction unit 13 in the shown example are made of a same material and are provided adjacent to each other without any seam therebetween. The measurement unit 12 includes the cavity 20, the first drain line 32 and the second drain line 34, and the pH sensor 15 is supported in the measurement unit 12. The introduction unit 13 includes the target liquid supply valve 21 and the cleaning liquid supply valve 22. The supply line 31 and the cleaning line 33 (including the connecting line 30) communicating with the cavity 20 are extended over the measurement unit 12 and the introduction unit 13.

In the pH measuring device 10 shown in FIG. 2, an adaptor 19 is disposed between the main body block 11 and the pH sensor 15. The adaptor 19 serves as an attachment, and it supports/fixes the pH sensor 15 and is supported/fixed by the main body block 11. Further, the way how to support the pH sensor 15 by the adaptor 19 and the way how to support the adaptor 19 by the main body block 11 are not particularly limited, and various fixing mechanisms such as insertion fitting and screwing may be employed.

As stated above, the cavity 20 is partitioned by the pH sensor 15 and the main body block 11, and a cross sectional diameter and a volume of the cavity 20 are defined according to a distance between the main body block 11 and the pH sensor 15. For the reason, a relative position of the pH sensor 15 with respect to the main body block 11 is defined by the adaptor 19, and the volume of the cavity 20 is adjusted. Thus, by selecting a characteristic of the actually used adaptor 19 appropriately, an appropriate distance corresponding to the characteristic (viscosity or the like) of the target liquid can be secured between the pH sensor 15 and the main body block 11, and the cross sectional diameter and the volume of the cavity 20 can be optimized.

Further, to reduce the amount of the target liquid used for the pH measurement, it is desirable that the volume of the cavity 20 is small. If, however, the cross sectional diameter and the volume of the cavity 20 are excessively small, the flow resistance of the cavity 20 increases, resulting in the increase of the pressure loss. Thus, the adaptor 19 is appropriately selected to allow the cavity 20 to have a cross sectional diameter and a volume which are appropriately set in consideration of the consumption amount of the target liquid by the pH measurement, the characteristic of the target liquid such as viscosity, and various other factors.

The pH sensor 15 is equipped with, as illustrated in FIG. 2, a pH detector 15a and an inlet line 15b connected to the pH detector 15a. A part of the target liquid stored in the cavity 20 is guided into the pH detector 15a via the inlet line 15b. Then, a pH (precisely, the potential difference between the standard liquid and the target liquid) of the introduced target liquid is measured by the pH detector 15a. The first drain line 32 is connected to the cavity 20 at a position higher than the pH detector 15a in the height direction Dh to allow the target liquid within the cavity 20 to reach the pH detector 15a securely after passing through the inlet line 15b.

Figure 3:
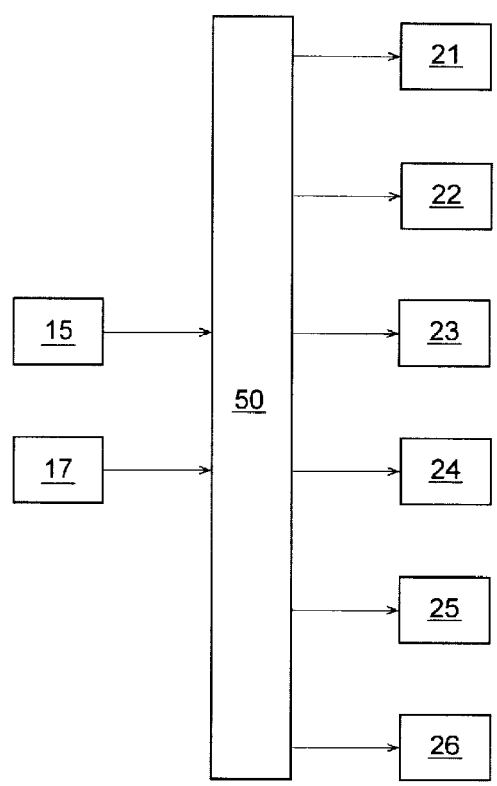
FIG. 3 is a block diagram illustrating a functional configuration of a controller.

FIG. 3 is a block diagram illustrating a functional configuration of the controller 50.

The controller 50 receives the measurement result of the pH sensor 15 and the detection result of the liquid amount detector 17. Further, the controller 50 controls opening/closing of each of the target liquid supply valve 21, the cleaning liquid supply valve 22, the cleaning liquid regulating valve 23, the cleaning gas regulating valve 24, the first drain valve 25 and the second drain valve 26 which are implemented by electromagnetic valves.

By way of example, the controller 50 controls the opening/closing of the target liquid supply valve 21 based on the detection result of the liquid amount detector 17. Since the controller 50 opens or closes the target liquid supply valve 21 automatically based on the detection result of the liquid amount detector 17, it is possible to supply the sufficient amount of the target liquid to the cavity 20 while suppressing the supply of the excessively large amount of the target liquid to the cavity 20.

The controller 50 can use the measurement result of the pH sensor 15 and the detection result of the liquid amount detector 17 for various purposes. By way of example, the controller 50 may use the detection result of the liquid amount detector 17 to obtain the appropriate pH of the target liquid.

In general, to detect the pH of the target liquid stably and accurately by the pH sensor, it is desirable that the pH sensor is immersed in the target liquid for a certain period of time (typically, 1 to 5 minutes). That is, immediately after the pH sensor is brought into contact with the target liquid, the measurement result of the pH sensor is instable, and reliability of the detection result is low. Thus, it is desirable to use, as a pH measurement value of the target liquid, a detection value of the pH sensor obtained after a lapse of a certain period of time in the state that the pH sensor is in contact with the target liquid. Therefore, the controller 50 can use, as the pH measurement value of the target liquid, a pH value detected by the pH sensor 15 after a lapse of a preset time (for example, about 2 minutes) after the liquid amount detector 17 detects the target liquid (that is, after the target liquid supply valve 21 is turned into the closed state).

In addition, the detection result of the pH sensor 15 may be sent to the controller 50 from the pH sensor 15 continually (regularly) or in response to a request from the controller 50.

[pH Measuring Method]

Now, an example of a pH measuring method using the pH measuring device 10 shown in FIG. 1 and FIG. 2 will be explained. Operations of the individual components of the pH measuring device 10 to be described below are performed under the control of the controller 50.

The pH measuring method in the shown example includes a process of flowing the target liquid toward the cavity 20 from the supply line 31 in the pH measuring device 10 and a process of measuring the pH of the target liquid by the pH sensor 15 which is in contact with the target liquid within the cavity 20.

To be more specific, the target liquid supply valve 21 is put in the open state; the cleaning liquid supply valve 22 and the first drain valve 25 are put in the closed state, and the target liquid (sample liquid) is supplied from the target liquid tank 40 into the cavity 20 via the supply line 31. If the storage of the target liquid in the liquid storage 16 is detected by the liquid amount detector 17, the target liquid supply valve 21 is turned into the closed state, and the supply of the target liquid into the cavity 20 is stopped. Then, upon a lapse of a predetermined time after the liquid amount detector 17 detects the target liquid within the liquid storage 16 or after the target liquid supply valve 21 is put in the closed state, the pH value detected by the pH sensor 15 (specifically, the pH detector 15a) is acquired as the pH measurement value of the target liquid.

Further, a cleaning processing for the cavity 20 performed when pH values of multiple kinds of processing liquids (a first processing liquid and a second processing liquid) are measured continuously is performed as follows, as an example.

That is, the target liquid supply valve 21 is put in the open state; the cleaning liquid supply valve 22 and the first drain valve 25 are put in the closed state; and the supply line 31 is connected to a supply source (not shown; see the target liquid tank 40) for the first processing liquid. Accordingly, the first processing liquid is supplied into the cavity 20 through the supply line 31, and the pH of the first processing liquid is detected by the pH sensor 15.

After the measurement of the pH of the first processing liquid, the target liquid supply valve 21 and the cleaning gas regulating valve 24 are put in the closed state; the cleaning liquid regulating valve 23 and the cleaning liquid supply valve 22 are put in the open state; and the cleaning liquid is supplied into the cavity 20 from the cleaning liquid tank 41 via the cleaning line 33. As a result, the first processing liquid remaining in the connecting line 30 and the cavity 20 is washed away.

At this time, the cleaning liquid introduced into the first drain line 32 by being overflown from the cavity 20 is sent to the liquid storage 16 through the communication line 35. By putting the second drain valve 26 in the open state, the cleaning liquid within the liquid storage 16 is drained into the drain tank 43 through the drain line 36. When necessary, the first drain valve 25 is put in the open state, and the cleaning liquid within the cavity 20 is drained into the drain tank 43 through the second drain line 34 and the drain line 36.

Thereafter, the target liquid supply valve 21 and the cleaning liquid regulating valve 23 are put in the closed state; the cleaning liquid supply valve 22 and the cleaning gas regulating valve 24 are input in the open state; and the cleaning gas (for example, a compressed gas such as $N_2$) is supplied into the cavity 20 from the cleaning gas tank 42 via the cleaning line 33. Accordingly, the liquid remaining in the connecting line 30 and the cavity 20 can be blown away by the cleaning gas to be drained through the first drain line 32 and/or the second drain line 34.

Afterwards, the cleaning liquid supply valve 22, the cleaning liquid regulating valve 23, the cleaning gas regulating valve 24 and the first drain valve 25 are put in the closed state; the target liquid supply valve 21 is put in the open state; and the supply line 31 is connected to a supply source (not shown) for the second processing liquid. Accordingly, the second processing liquid is supplied into the cavity 20 through the supply line 31, and the pH of the second processing liquid can be detected by the pH sensor 15.

As stated above, in the pH measuring device 10 and the pH measuring method according to the present exemplary embodiment, the cavity 20, the supply line 31, the first drain line 32 and the target liquid supply valve 21 are provided in the main body block 11 having the integral structure. Accordingly, the total length of the supply line 31 can be shortened, so that the volume of the supply line 31 can be reduced. Therefore, the amount of the target liquid reserved in the supply line 31 can be reduced, so that the amount of the target liquid sent from the target liquid supply valve 21 into the cavity 20 can be reduced.

Conventionally, an introduction block and a measurement block as separate bodies are connected to each other with a seam therebetween, and a supply line of the introduction block and a supply line of the measurement block are connected via a supply line formed at the seam. Meanwhile, according to the above-described pH measuring device 10 equipped with the main body block 11 having the integral structure, the supply line 31 is continuously extended over the introduction unit 13 and the measurement unit 12. Thus, the conventionally required seam is not necessary. Therefore, the above-described pH measuring device 10 does not need to have at least a portion corresponding to the supply line formed at the conventional seam, so the total length of the supply line 31 can be shortened.

The present inventor has conducted various simulations based on the conventional pH measuring device in which the introduction block and the measurement block as the separate bodies are connected to each other with the seam therebetween and the pH measuring device 10 equipped with the main body block 11 having the above-described integral structure. As a result, according to the above-described pH measuring device 10 equipped with the main body block 11 having the integral structure, it is found out that the amount of the target liquid (sample liquid) used in the pH measurement can be reduced to be equal to or less than 1/10, as compared to the conventional pH measuring device.

As stated above, by providing the cavity 20, the supply line 31, the first drain line 32 and the target liquid supply valve 21 in the main body block 11 having the integral structure, the target liquid can be rapidly sent to the cavity 20 while the consumption amount of the target liquid is reduced when the pH of the target liquid is measured.

Further, by adjusting the distance between the pH sensor 15 and the main body block 11 through the use of the adaptor 19, the cross sectional diameter and the volume of the cavity 20 can be optimized according to the characteristic of the target liquid such as the viscosity thereof. By minimizing the cross sectional diameter and the volume of the cavity 20, the necessary and sufficient amount of the target liquid can be stored in the cavity 20. Therefore, the pH measurement can be carried out appropriately while the waste of the target liquid through the pH measurement is minimized.

Moreover, according to the above-described pH measuring device 10, the target liquid drained from the cavity 20 is detected by the liquid amount detector 17 in the liquid storage 16, and the opening/closing of the target liquid supply valve 21 is controlled based on the detection result of the liquid amount detector 17. Accordingly, the cavity 20 can be securely filled with the target liquid in the necessary amount for the pH measurement while the amount of the target liquid supplied to the cavity 20 via the supply line 31 is reduced.

As stated above, according to the pH measuring apparatus 10 and the pH measuring method, it is possible to measure the pH of the target liquid accurately while reducing the amount of the target liquid used for the pH measurement.

[Application Examples]

The pH measuring device 10 and the pH measuring method described above have a wide range of applications to various kinds of apparatuses and methods and other relevant technologies. By way of example, the pH measuring device 10 and the pH measuring method described above can be applied to a semiconductor processing system configured to perform a chemical liquid processing such as a plating processing.

Figure 4:
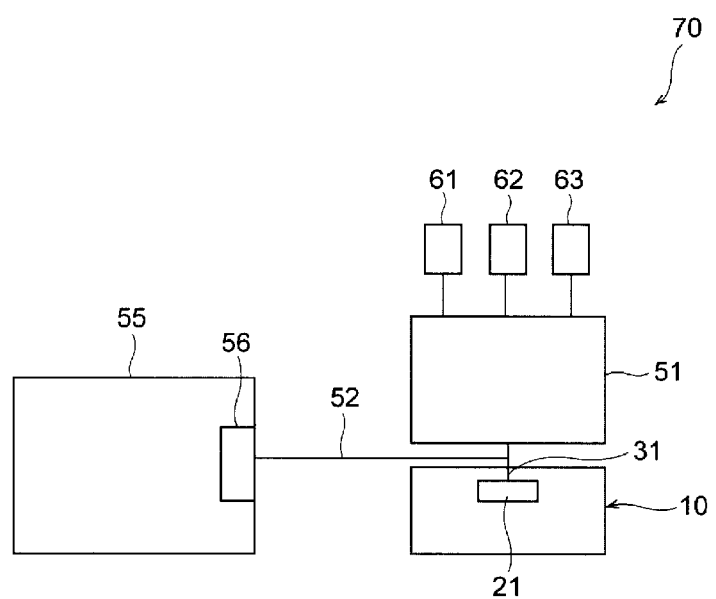
FIG. 4 is a block diagram schematically illustrating an example of a semiconductor processing system.

FIG. 4 is a block diagram schematically illustrating an example of a semiconductor processing system 70. The semiconductor processing system 70 shown in FIG. 4 includes a mixed solution tank 51, a semiconductor processing apparatus 55 and the pH measuring device 10 shown in FIG. 1 and FIG. 2.

The mixed solution tank 51 stores therein a mixed solution containing multiple kinds of chemical liquids. The mixed solution tank 51 is connected to a multiple number of chemical liquid supplies (a first chemical liquid supply 61, a second chemical liquid supply 62, and a third chemical liquid supply 63), and chemical liquids from the respective chemical liquid supplies are supplied to the mixed solution tank 51. As the chemical liquids supplied to the mixed solution tank 51 from the respective chemical liquid supplies are mixed by an agitator (not shown) in the mixed solution tank 51, the mixed solution is prepared in the mixed solution tank 51.

Specific components of the mixed solution prepared as described above are not particularly limited. By way of example, the mixed solution prepared in the mixed solution tank 51 may be a plating liquid for use in a plating processing on a semiconductor wafer.

The semiconductor processing apparatus 55 is equipped with a mixed solution supply nozzle 56 which is connected to the mixed solution tank 51 via a mixed solution outlet line 52, and the mixed solution discharged from the mixed solution supply nozzle 56 can be used in a semiconductor processing. For instance, the mixed solution (for example, the plating liquid) discharged from the mixed solution supply nozzle 56 may be supplied to a processing surface of a wafer (not shown) held in the semiconductor processing apparatus 55.

In the above-described semiconductor processing system 70 shown in FIG. 4, the supply line 31 of the pH measuring device 10 is connected to the mixed solution tank 51 via the mixed solution outlet line 52. A part of the mixed solution stored in the mixed solution tank 51 is supplied to the pH measuring device 10 through the mixed solution outlet line 52 and the supply line 31. Further, the supply line 31 may be connected to the mixed solution tank 51 through a line other than the mixed solution outlet line 52. Further, a branch line may be branched off from the mixed solution outlet line 52, and an end of this branch line may be connected to the mixed solution tank 51. In this configuration, since the mixed solution introduced into the mixed solution outlet line 52 from the mixed solution tank 51 can be returned back into the mixed solution tank 51 through the branch line, the mixed solution can be circulated.

For example, in the above-described semiconductor processing system 70, an intermediate solution may be produced by mixing the first chemical liquid from the first chemical liquid supply 61 and the second chemical liquid from the second chemical liquid supply 62 in the mixed solution tank 51. Then, the third chemical liquid from the third chemical liquid supply 63 may be added to the intermediate solution. In this case, the intermediate solution may be produced while measuring a pH of the mixed solution of the first chemical liquid and the second chemical liquid by the pH measuring device 10. Further, a final mixed solution may be prepared while measuring a pH of the mixed solution of the intermediate solution and the third chemical liquid. According to this preparation method, since the intermediate solution as well as the final mixed solution can be produced to have a required pH value, it is possible to prepare the required mixed solution with high precision.

Particularly, by using the pH measuring device 10 and the pH measuring method as stated above, the pH of the target liquid can be measured by using a very small amount of the target liquid (sample liquid). Thus, the amount of the chemical liquids consumed by the pH measurement while producing the intermediate solution can be reduced, and the amount of the chemical liquids consumed by the pH measurement while producing the final mixed solution can be reduced. Accordingly, a large deviation of a content and a content ratio of the chemical liquids in the final mixed solution from a required content and a required content ratio that might be caused by the pH measurement can be effectively suppressed. As stated above, according to the semiconductor processing system 70 shown in FIG. 4, the high-quality mixed solution can be prepared in the mixed solution tank 51 and supplied to the semiconductor processing apparatus 55.

[Modification Examples]

The present disclosure is not limited to the above-described exemplary embodiments and the modification examples as they are, and constituent elements can be modified and changed in an embodiment within the scope of the present disclosure. Further, the constituent elements described in the above exemplary embodiments and the modification examples can be combined appropriately to form various kinds of apparatuses and methods. By way of example, some of the constituent elements shown in the exemplary embodiments and the modification examples may be omitted. Further, the constituent elements in the different exemplary embodiments and the modification examples may be combined appropriately.

By way of example, the present disclosure may be embodied with a program for, allowing, when executed on a computer for controlling an operation of the pH measuring device 10, the computer to control the pH measuring device 10 to implement the above-described pH measuring method; and a recording medium which stores the program therein.

According to the exemplary embodiments, it is possible to reduce the amount of the target liquid used for the pH measurement.

I claim:

1. A pH measuring device configured to measure a pH of a target liquid, comprising:
a main body block comprising a cavity, a supply line communicating with the cavity, a first drain line communicating with the cavity, and a target liquid supply valve configured to adjust a supply of the target liquid into the supply line,
wherein the main body block has an integral structure in which a pH sensor is supported such that the pH sensor is in contact with a target liquid within the cavity, and
wherein the first drain line is connected to the cavity at a position higher than where the supply line is connected to the cavity.

2. The pH measuring device of claim 1,
wherein the main body block comprises a measurement unit and an introduction unit,
the cavity and the first drain line are provided in the measurement unit,
the target liquid supply valve is provided in the introduction unit,
the supply line is provided in the measurement unit and the introduction unit, and
the measurement unit and the introduction unit are adjacent to each other without a seam therebetween.

3. The pH measuring device of claim 1,
wherein the main body block comprises:
a cleaning line communicating with the cavity; and
a cleaning liquid supply valve configured to adjust a supply of a cleaning liquid to the cleaning line.

4. The pH measuring device of claim 3,
wherein the main body block comprises a connecting line extended from the cavity,
the connecting line forms at least a part of the supply line and at least a part of the cleaning line, and
an entire portion of the connecting line forming the supply line forms a part of the cleaning line.

5. The pH measuring device of claim 1, further comprising:
an adaptor disposed between the main body block and the pH sensor,
wherein the adaptor is configured to set a relative position of the pH sensor with respect to the main body block such that a volume of the cavity can be adjusted.

6. A pH measuring device configured to measure a pH of a target liquid, comprising:
a main body block comprising a cavity, a supply line communicating with the cavity, a first drain line communicating with the cavity, and a target liquid supply valve configured to adjust a supply of the target liquid into the supply line,
wherein the main body block has an integral structure in which a pH sensor is supported such that the pH sensor is in contact with a target liquid within the cavity,
wherein the main body block comprises:
a cleaning line communicating with the cavity;
a cleaning liquid supply valve configured to adjust a supply of a cleaning liquid to the cleaning line;
a second drain line communicating with the cavity at a position under the first drain line; and
a drain valve configured to adjust a flow of a liquid from the cavity into the second drain line.

7. A pH measuring device configured to measure a pH of a target liquid, comprising:
a main body block comprising a cavity, a supply line communicating with the cavity, a first drain line communicating with the cavity, and a target liquid supply valve configured to adjust a supply of the target liquid into the supply line,
wherein the main body block has an integral structure in which a pH sensor is supported such that the pH sensor is in contact with a target liquid within the cavity,
wherein the pH measuring device further comprises:
a liquid storage container communicating with the cavity through the first drain line; and
a liquid amount detector configured to detect a liquid stored in the liquid storage container,
wherein the liquid storage container is configured such that a liquid introduced into the first drain line by being overflown from the cavity is sent to the liquid storage container.

* * * * *